United States Patent
Pook et al.

(10) Patent No.: US 9,440,402 B2
(45) Date of Patent: *Sep. 13, 2016

(54) COMPOSITE STRUCTURES HAVING INTEGRATED STIFFENERS WITH SMOOTH RUNOUTS AND METHOD OF MAKING THE SAME

(71) Applicant: The Boeing Company, Chicago, IL (US)

(72) Inventors: David A. Pook, Malvern East (AU); Peter J. Lockett, Fairfield (AU); Andrew K. Glynn, North Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 496 days.

This patent is subject to a terminal disclaimer.

(21) Appl. No.: 14/141,433

(22) Filed: Dec. 27, 2013

(65) Prior Publication Data

US 2015/0328846 A1     Nov. 19, 2015

Related U.S. Application Data

(60) Division of application No. 13/012,162, filed on Jan. 24, 2011, now Pat. No. 8,636,252, which is a continuation-in-part of application No. 12/823,414, filed on Jun. 25, 2010, now Pat. No. 8,628,717.

(51) Int. Cl.
*B29C 70/48* (2006.01)
*B29C 70/06* (2006.01)
(Continued)

(52) U.S. Cl.
CPC ............. *B29C 70/48* (2013.01); *B29B 11/04* (2013.01); *B29C 65/4835* (2013.01); *B29C 65/5057* (2013.01); *B29C 65/564* (2013.01); *B29C 66/472* (2013.01); *B29C 66/474* (2013.01); *B29C 66/4722* (2013.01); *B29C 66/532* (2013.01); *B29C 66/61* (2013.01); *B29C 66/721* (2013.01); *B29C 66/72141* (2013.01); *B29C 66/81455* (2013.01); *B29C 70/06* (2013.01); *B29C 70/443* (2013.01); *B29C 70/865* (2013.01); *B29D 99/0014* (2013.01); *B29D 99/0017* (2013.01); *B64C 1/12* (2013.01);

(Continued)

(58) Field of Classification Search
None
See application file for complete search history.

(56) References Cited

U.S. PATENT DOCUMENTS 2,709,973 A    6/1955  Meyer et al.
3,339,333 A    9/1967  Kovalcki
(Continued)

FOREIGN PATENT DOCUMENTS

CN    101772452 A    7/2010
EP    2452808 A1    5/2012
(Continued)

OTHER PUBLICATIONS

International Search Report, dated Sep. 26, 2011, regarding Application No. PCT/US2011/036191 (WO2011162884), 10 pages.
(Continued)

*Primary Examiner* — Monica Huson
(74) *Attorney, Agent, or Firm* — Yee & Associates, P.C.

(57) ABSTRACT

A unitized composite structure comprises a composite member having at least one integrally formed composite stiffener. At least one end of the stiffener includes a runout forming a substantially smooth transition between the stiffener and the composite structure.

7 Claims, 14 Drawing Sheets

(51) Int. Cl.
*B29B 11/04* (2006.01)
*B29C 65/50* (2006.01)
*B29C 65/56* (2006.01)
*B29C 65/00* (2006.01)
*B29C 70/44* (2006.01)
*B29C 70/86* (2006.01)
*B29D 99/00* (2010.01)
*B64C 1/12* (2006.01)
*B64C 1/14* (2006.01)
*B64C 3/26* (2006.01)
*B29C 65/48* (2006.01)
*B29K 101/10* (2006.01)
*B29K 105/08* (2006.01)
*B29L 9/00* (2006.01)
*B29L 31/30* (2006.01)

(52) U.S. Cl.
CPC ............... *B64C1/1446* (2013.01); *B64C 3/26* (2013.01); *B29C 66/7212* (2013.01); *B29C 66/7394* (2013.01); *B29K 2101/10* (2013.01); *B29K 2105/0827* (2013.01); *B29L 2009/00* (2013.01); *B29L 2031/3076* (2013.01); *B29L 2031/3082* (2013.01); *Y02T 50/433* (2013.01); *Y10T 156/10* (2015.01); *Y10T 428/2457* (2015.01); *Y10T 428/24488* (2015.01); *Y10T 428/24521* (2015.01); *Y10T 428/24612* (2015.01)

(56) References Cited

U.S. PATENT DOCUMENTS

| | | |
|---|---|---|
| 3,775,238 A | 11/1973 | Lyman |
| 3,890,749 A | 6/1975 | Gunther |
| 4,357,292 A | 11/1982 | Myers |
| 4,606,961 A | 8/1986 | Munsen et al. |
| 4,942,013 A | 7/1990 | Palmer et al. |
| 5,419,965 A | 5/1995 | Hampson |
| 5,567,499 A | 10/1996 | Cundiff et al. |
| 5,569,508 A | 10/1996 | Cundiff |
| 5,601,852 A | 2/1997 | Seemann |
| 5,771,680 A | 6/1998 | Zahedi et al. |
| 5,851,336 A | 12/1998 | Cundiff et al. |
| 6,156,146 A | 12/2000 | Cundiff |
| 6,319,447 B1 | 11/2001 | Cundiff et al. |
| 6,415,496 B1 | 7/2002 | Dominguez Casado et al. |
| 6,561,478 B2 | 5/2003 | Cundiff et al. |
| 6,586,054 B2 | 7/2003 | Walsh |
| 6,589,618 B2 | 7/2003 | Cundiff et al. |
| 6,627,142 B2 | 9/2003 | Slaughter et al. |
| 6,811,733 B2 | 11/2004 | Nelson et al. |
| 6,840,750 B2 | 1/2005 | Thrash et al. |
| 6,872,340 B2 | 3/2005 | Cundiff et al. |
| 6,896,841 B2 | 5/2005 | Velicki et al. |
| 7,074,474 B2 | 7/2006 | Toi et al. |
| 7,080,805 B2 | 7/2006 | Prichard et al. |
| 7,138,028 B2 | 11/2006 | Burpo et al. |
| 7,334,782 B2 | 2/2008 | Woods et al. |
| 7,413,695 B2 | 8/2008 | Thrash et al. |
| 7,419,627 B2 | 9/2008 | Sheu et al. |
| 7,510,757 B2 | 3/2009 | Lee et al. |
| 7,633,040 B2 | 12/2009 | Glain et al. |
| 7,682,682 B2 | 3/2010 | Leon-Dufour et al. |
| 8,042,315 B2 | 10/2011 | Ashton et al. |
| 8,042,767 B2 | 10/2011 | Velicki et al. |
| 8,043,453 B2 | 10/2011 | Sawicki et al. |
| 8,091,603 B2 | 1/2012 | Pham et al. |
| 8,182,628 B2 | 5/2012 | Biornstad et al. |
| 8,267,354 B2 | 9/2012 | Kallinen et al. |
| 8,302,909 B2 | 11/2012 | Cazeneuve et al. |
| 8,424,806 B2 | 4/2013 | Outon Hernandez et al. |
| 8,628,717 B2 * | 1/2014 | Pook .................. B29C 70/443 264/510 |
| 8,636,252 B2 | 1/2014 | Lockett et al. |
| 8,940,213 B2 | 1/2015 | Pook et al. |
| 2003/0025231 A1 | 2/2003 | Slaughter et al. |
| 2003/0025232 A1 | 2/2003 | Slaughter et al. |
| 2004/0032062 A1 | 2/2004 | Slaughter et al. |
| 2004/0219244 A1 | 11/2004 | Filsinger et al. |
| 2005/0003145 A1 | 1/2005 | Toi et al. |
| 2005/0031720 A1 | 2/2005 | Lippert et al. |
| 2005/0073076 A1 | 4/2005 | Woods et al. |
| 2005/0211846 A1 | 9/2005 | Leon-Dufour et al. |
| 2007/0108665 A1 | 5/2007 | Glain et al. |
| 2008/0246175 A1 | 10/2008 | Biornstad et al. |
| 2009/0044914 A1 | 2/2009 | Pham et al. |
| 2009/0057487 A1 | 3/2009 | Velicki et al. |
| 2009/0200425 A1 | 8/2009 | Kallinen et al. |
| 2010/0024958 A1 | 2/2010 | Sawicki et al. |
| 2010/0108245 A1 | 5/2010 | Nishiyama et al. |
| 2010/0170989 A1 | 7/2010 | Gray |
| 2011/0311782 A1 | 12/2011 | Richmond et al. |
| 2011/0315824 A1 | 12/2011 | Pook et al. |
| 2012/0052247 A1 | 3/2012 | Pook et al. |
| 2012/0119422 A1 | 5/2012 | Lockett et al. |
| 2012/0234978 A1 | 9/2012 | Hernando Navas et al. |
| 2013/0264751 A1 | 10/2013 | Lockett et al. |
| 2015/0125565 A1 | 5/2015 | Lockett et al. |

FOREIGN PATENT DOCUMENTS

| | | |
|---|---|---|
| NL | 1001725 C2 | 5/1997 |
| WO | WO2004011169 A2 | 2/2004 |
| WO | WO2006096647 A2 | 9/2006 |
| WO | WO2008114809 A1 | 9/2008 |
| WO | WO2010060908 A2 | 6/2010 |
| WO | WO2011003844 A1 | 1/2011 |
| WO | WO2011162884 A2 | 12/2011 |

OTHER PUBLICATIONS

European Search Report, dated Feb. 16, 2012, regarding Application No. EP11187924 (EP2452808), 8 pages.

International Search Report, dated May 3, 2012, regarding Application No. PCT/US2011/063658 (WO2012102789), 12 pages.

Byrd et al., "The estimate of the effect of z-pins on the strain release rate, fracture, and fatigue in a composite co-cured z-pinned double cantilever beam," Composites Structures, 2005, vol. 68, No. 1, pp. 53-63.

Campbell, "Cure Tooling," In: Manufacturing Processes for Advanced Composites, 2004. Elsevier Ltd., Oxford, pp. 128-129.

Han et al., "Resin film infusion of stitched stiffened composite panels," Composites Part A: Applied Science and Manufacturing, 2003, vol. 34, pp. 227-236.

Higgins et al., "Design and testing of the Minotaur advanced grid-stiffened fairing," Composite Structures, 2004, vol. 66, No. 1-4, pp. 339-349.

Key et al., "Progressive failure predictions for rib-stiffened panels based on multicontinuum technology," Composite Structures, 2004, vol. 65, No. 3-4, pp. 357-366.

Mouritz, "Review of z-pinned composite laminates," Composites Part A: Applied Science and Manufacturing, 2007, vol. 38, No. 12, pp. 2383-2397.

Sheppard et al., "Rib separation in postbuckling stiffened shear panels," Composite Structures, 1998, vol. 41, No. 3-4, pp. 339-352.

Stickler et al., "Investigation of mechanical behavior of transverse stitched T-joints with PR520 resin in flexure and tension," Composite Structures, 2001, vol. 52, No. 3-4, pp. 307-314.

Office Action, dated Aug. 16, 2012, regarding U.S. Appl. No. 12/944,089, 26 pages.

Final Office Action, dated Dec. 21, 2012, regarding U.S. Appl. No. 12/944,089, 24 pages.

EP Examination Communication dated May 6, 2013, regarding Application No. EP11187924.3, 5 pages.

International Preliminary Report on Patentability, dated Jul. 30, 2013, regarding Application No. PCT/US2011/063658, 7 pages.

(56) References Cited

OTHER PUBLICATIONS

Office Action, dated May 6, 2013, regarding U.S. Appl. No. 13/012,162, 28 pages.
Notice of Allowance, dated Sep. 20, 2013, regarding U.S. Appl. No. 13/012,162, 12 pages.
Notice of Allowance, dated Oct. 3, 2014, regarding U.S. Appl. No. 12/944,089, 9 pages.
Notice of Reasons for Rejection and English Translation dated Apr. 15, 2015, regarding Japanese Patent Application No. 2011-238929, 5 pages.
State Intellectual Property Office of PRC Notification of First Office Action and English Translation, dated Mar. 6, 2015, regarding Application No. 201180065886.2, 15 pages.
State Intellectual Property Office of PRC Notification of First Office Action and English Translation, dated Apr. 3, 2015, regarding Application No. 201110349327.6, 23 pages.
Office Action, dated Jun. 4, 2014, regarding U.S. Appl. No. 12/944,089, 22 pages.
Notice of Reasons for Rejection and English Translation, issued Aug. 4, 2015, regarding Japanese Patent Application No. 2013-550467, 5 pages.

\* cited by examiner

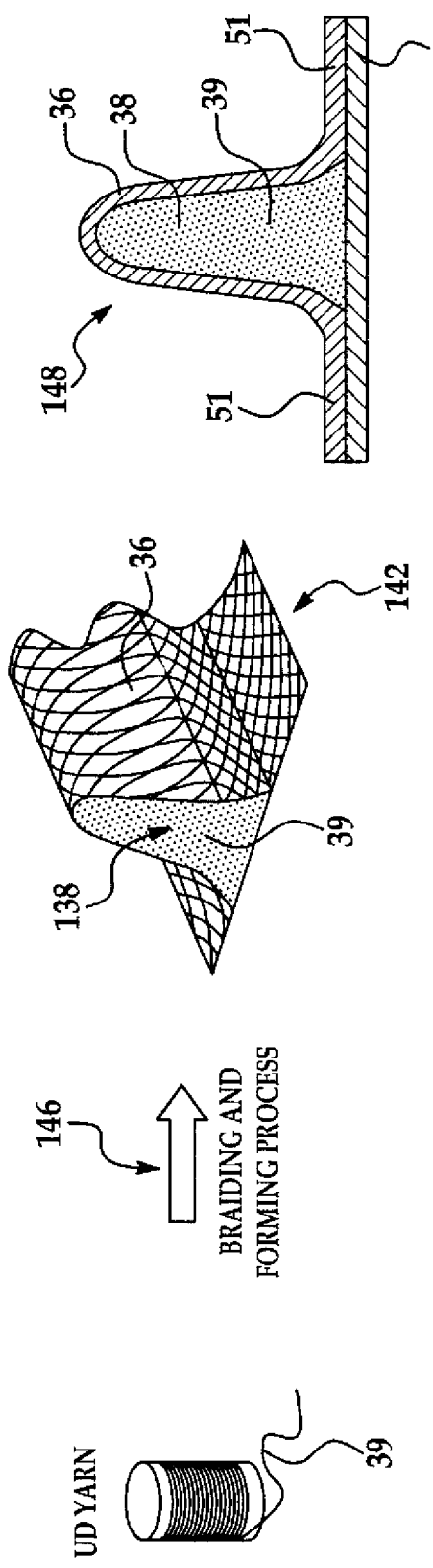
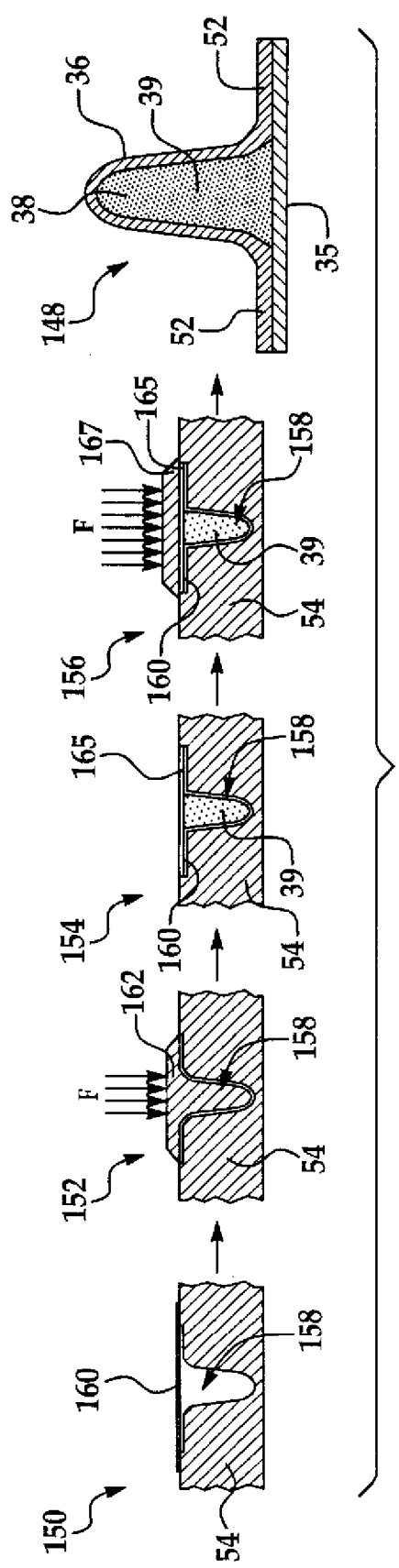
FIG. 38
FIG. 39
FIG. 40

COMPOSITE STRUCTURES HAVING INTEGRATED STIFFENERS WITH SMOOTH RUNOUTS AND METHOD OF MAKING THE SAME

CROSS REFERENCE TO RELATED APPLICATIONS

This application is a divisional of application Ser. No. 13/012,162, filed Jan. 24, 2011, which is a continuation-in-part of co-pending U.S. patent application Ser. No. 12/823,414 filed Jun. 25, 2010, the entire disclosure of both applications are incorporated by reference herein.

TECHNICAL FIELD

This disclosure generally relates to composite structures, and deals more particularly with composite structural members having integrated stiffeners, and to methods for making such members.

BACKGROUND

It is sometimes necessary to reinforce composite structures, such as those used in aerospace industry in order to meet strength and/or stiffness requirements. These structures may be reinforced by adding stiffeners to the structure which may provide the structure with additional strength and rigidity. In the past, individual stiffeners have been attached to primary structural members using any of several secondary assembly processes, including but not limited to the use of discrete fasteners, bonding, co-bonding and co-curing. Each of these processes may have disadvantages, such as, without limitation, the additional time and labor to complete the assembly process and/or the need for relatively expensive capital equipment such as autoclaves used to co-cure parts. Additionally, in some cases, the stiffeners may comprise multiple parts which may add undesirable weight and/or part count to a vehicle and/or increase the time and labor required to complete the assembly process. In some applications where the stiffeners are integrated into the structural member, the ends of the stiffeners, referred to as "runouts", may not blend or transition smoothly into the member, which may result in undesirable stress concentrations in the structural member. Existing runout designs have discontinuous fibers at trimmed edges that may only moderately reduce stress concentrations in the surrounding structure.

Accordingly, there is a need for a simple, cost effective method of making stiffened composite structures in which stiffeners are integrated into structural members to form a unitized structure. There is also a need for a stiffener design having runouts that blend smoothly into the structural member and reduce or eliminate stress concentrations at the ends of the stiffeners.

SUMMARY

The disclosed embodiments provide a unitized composite structure having integrated stiffeners with smoothly transitioned runouts at their ends which reduce or substantially eliminate stress concentrations. The stiffeners are produced using fiber preforms that are shaped to blend the ends of the stiffeners into the surrounding structure. This smooth blending avoids abrupt terminations or discontinuous transitions between the stiffener and the surrounding structure, and may reduce or eliminate the need for trimming operations at the ends of the stiffeners. The reduction in trimming operations may reduce fabrication time, process steps and/or labor costs. The runout transitions the stiffener cross section from a tall narrow profile to a wide flat profile, while maintaining a constant perimeter and cross sectional area. A variety of stiffener architectures and physical characteristics may be realized using various preform fabrication processes. The runout design allows fabrication of stiffeners having complex geometries, resulting in greater design flexibility and process optimization.

According to one disclosed embodiment, a unitized composite structure comprises a composite member and at least one composite stiffener formed integral with the composite member for stiffening the member. At least one end of the stiffener includes a runout forming a substantially smooth transition into the composite member. The composite member includes a first resin infused fiber reinforcement, and the stiffener includes a second resin infused reinforcement, wherein the infused resin is substantially continuous and homogeneous throughout the first and second fiber reinforcements. The runout has a cross section that varies in shape but remains substantially constant in area along its length.

According to another embodiment, an integrally stiffened composite structure comprises a cured polymer resin matrix, a structural member portion including a first fiber reinforcement held in the matrix, and a stiffener portion for stiffening the structural member portion. The stiffener portion includes a second fiber reinforcement held in the matrix. The stiffener portion includes at least one end having a runout forming a substantially smooth transition into the structural member portion. The matrix is substantially continuous and homogeneous throughout the first and second portions.

According to a further embodiment, a method is provided of making a stiffened composite structure. The method comprises fabricating a first fiber preform, placing the first fiber preform in a mold recess having the geometry of the stiffener, placing a second fiber preform over the mold recess covering the first preform, co-infusing the first and second fiber preforms with a polymer resin, and curing the resin-infused preforms. Fabricating the first fiber preform includes braiding fibers into a flexible tubular shell, and filling the shell with continuous unidirectional fibers. Placing the first fiber preform in the mold recess includes conforming the tubular shell to the geometry of the recess.

BRIEF DESCRIPTION OF THE ILLUSTRATIONS

FIG. 38 is an illustration showing steps for fabricating the preform shown in FIG. 37.

FIG. 39 is an illustration of a cross sectional view of a further embodiment of the preform.

FIG. 40 is an illustration showing steps used to fabricate the preform illustrated in FIG. 39.

DETAILED DESCRIPTION

Figure 1:
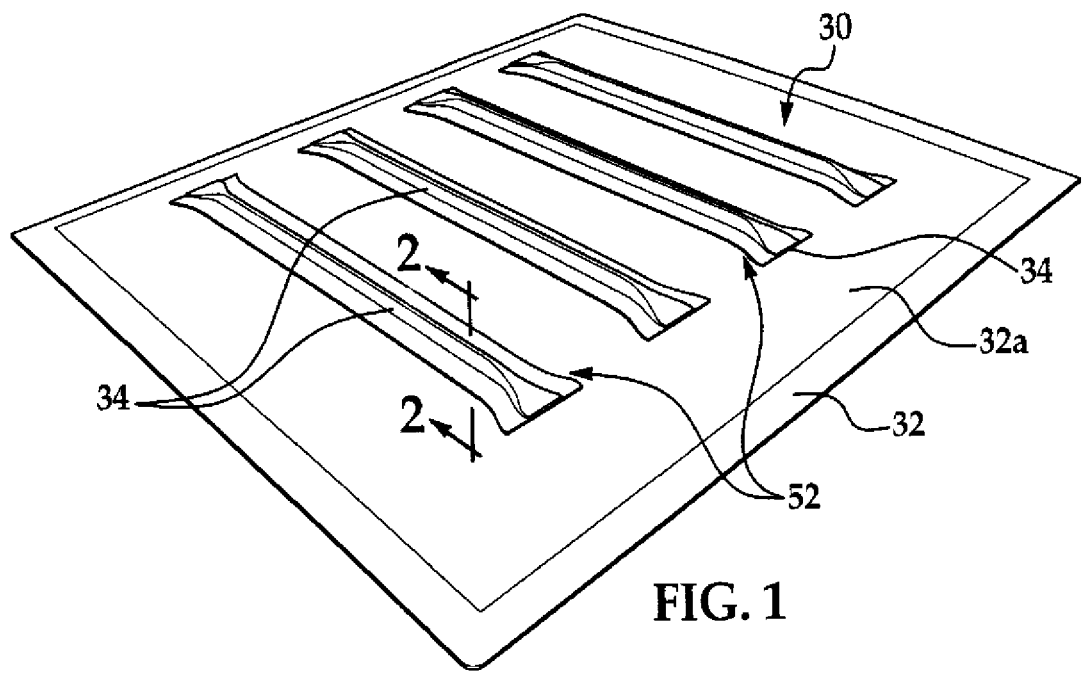
FIG. 1 is an illustration of a perspective view of a unitized composite panel having integrally formed stiffeners.

Referring first to FIG. 1, a unitized composite structure 30 comprises a structural member 32 having a plurality of integrally formed stiffeners 34 which may provide the structural member 32 with additional strength and rigidity. In the illustrated example, the structural member 32 is a substantially flat panel 32a, and the stiffeners 34 are arranged to extend substantially parallel to each other on one side of the panel 32a. Each of the stiffeners 34 includes a runout 52 on each end thereof which blends the stiffener 34 substantially smoothly into the panel 32a in order to reduce peak stress concentrations in the panel 32a. As will be discussed later, the structural member 32 may have other shapes and geometries, depending on the application, including but not limited to channels, beams, webs, flanges, skins and the like.

Figure 2:
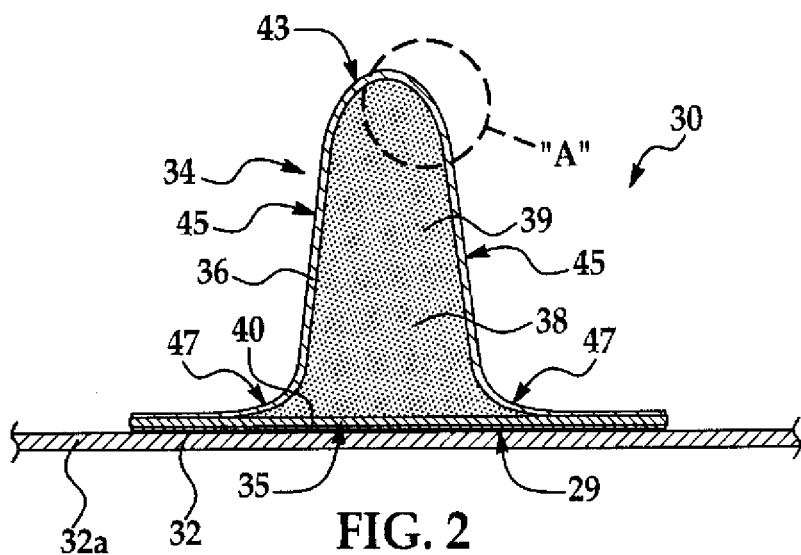
FIG. 2 is an illustration of a cross sectional view taken along the line 2-2 in FIG. 1.

Referring now to FIG. 2, each of the stiffeners 34 is modular in design and comprises an inner core 38 surrounded by an outer shell 36 having a bottom cap 35 joined to the panel 32a along a butt joint 29. An optional layer of adhesive 40 may be used to assist in joining the stiffener 34 to the panel 32a at the butt joint 29. As will be discussed later in more detail, the shell 36 may comprise one or more layers (not shown in FIG. 2) of a resin infused composite member fiber reinforcement or preform 67 (FIG. 14) that may be braided, knitted or woven as a fabric. The reinforcing fibers may comprise carbon, glass or a variety of polymers or other suitable reinforcements. In this example, the shell 36 is continuous and includes a radius top or crown 43 and sidewalls 45 that are integrally connected with radius sections 47 overlying the panel 32a.

Figure 3:
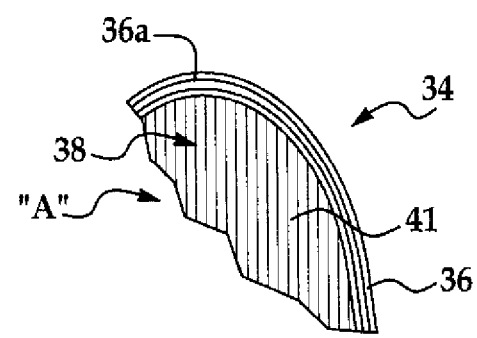
FIG. 3 is an illustration of a sectional view of a corner of an alternate form of the stiffener corresponding to the portion designated as "A" in FIG. 2.

The inner core 38 may be partially or completely filled with a structural or non-structural material, depending upon the application. In the case of the example shown in FIG. 2, the inner core 38 is filled with a suitable unidirectional carbon fiber reinforcement 39. FIG. 3 illustrates an alternate embodiment of the modular stiffener 34 wherein the shell 36 comprises multiple layers 36a of braided fibers held in a resin matrix, and the core 38 is filled with one or more plies 41 of fiber reinforced resin which may be in the form of unidirectional tape, tows or a fabric.

Figure 4:
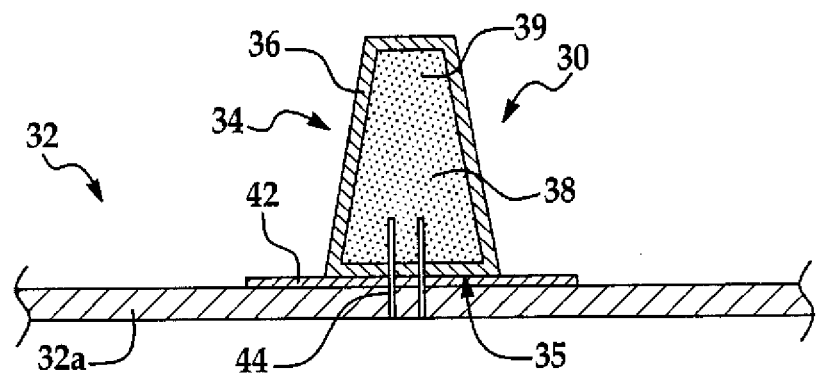
FIGS. 4-13 are illustrations of sectional views respectively showing alternate forms of the stiffener.

As mentioned above, the stiffener 34 may have numerous variations in geometry and/or construction details. FIG. 4 illustrates a stiffener 34 similar to that shown in FIG. 2, but wherein through thickness reinforcements, such as but not limited to Z-Pins, 44 are optionally used to aid in joining the stiffener 34 to the panel 32a and to provide additional reinforcement of the structure 32. The Z-pins 44 extend through the panel 32a and bottom cap 35 of the stiffener 34 into the core 38. The stiffener 34 shown in FIG. 4 is generally trapezoidal in cross section however, other cross sectional shapes may be possible, including but not limited to a "T", a "J", a "C", an "I", a "Z" or a hat. In other embodiments, the stiffener 34 may comprise a solid laminate (not shown), or a core with solid laminate facesheets (not shown).

Figure 5:
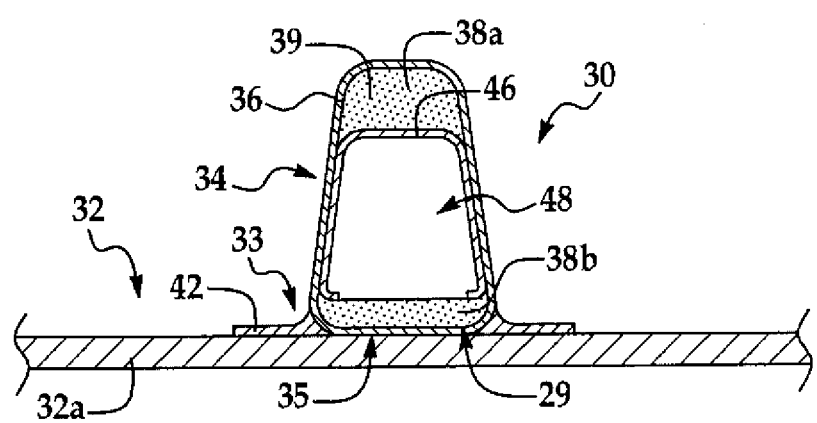

FIG. 5 illustrates another variation of the stiffener 34 which includes an inner shell 46 that divides the core 38 into a hollow core section 48 separating two core sections 38a. 38b that may or may not be filled with structural reinforcement 39 or other filler. In this example, the base cap 35 is joined directly to the panel 32a along a butt joint 29, and adhesive 42 is used along the outer margins 33 of the butt joint 29.

Figure 6:
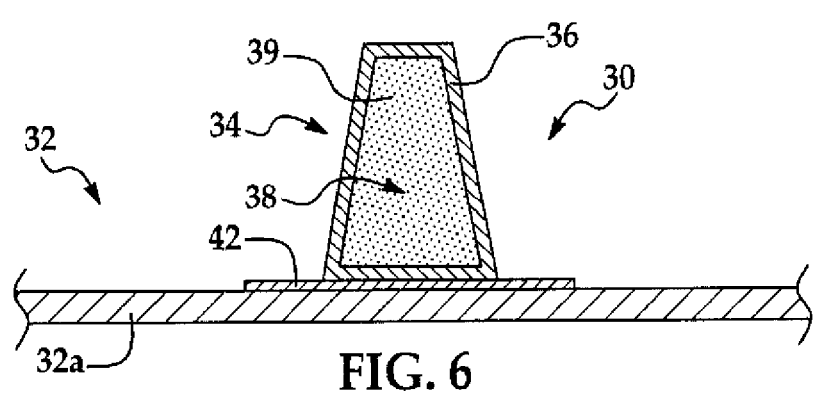

FIG. 6 illustrates another version of the stiffener 34, similar to that shown in FIG. 2, but wherein the core 38 is hollow.

Figure 7:
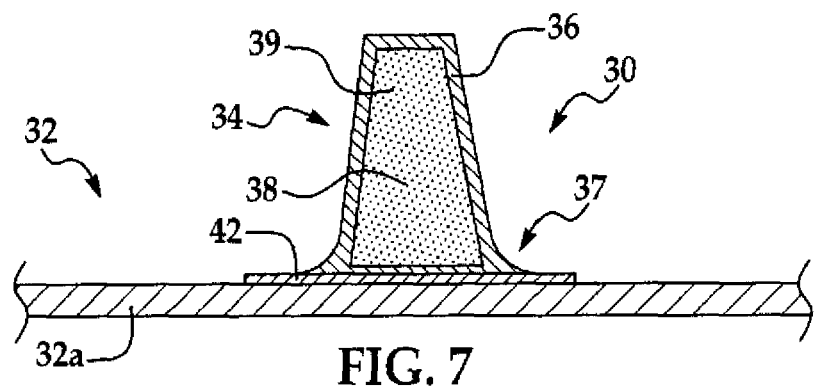

Still another variation of the stiffener 34 is shown in FIG. 7 having an inner core 38 filled with reinforcement 39 and lower side wall edges 37 that are radiused.

Figure 8:
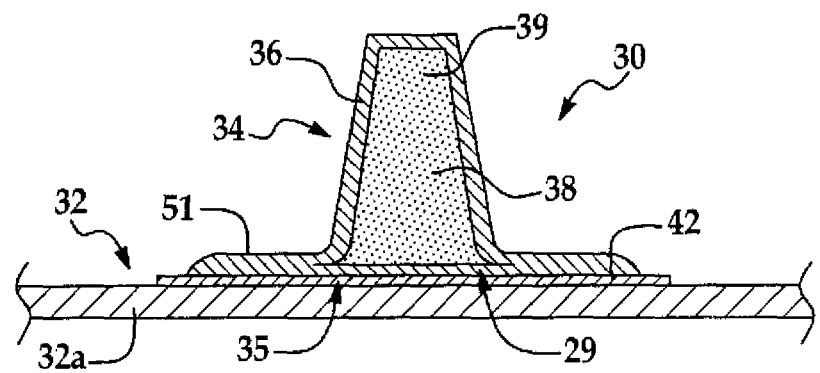

FIG. 8 illustrates another embodiment of the stiffener 34 wherein the outer shell 36 has laterally extending flanges 51 overlying the base cap 35. The flanges 51 increase the area of the butt joint 29 between the stiffener 34 and the panel 32a, while also providing a smooth transition between the shell 36 and the panel 32a that assists in minimizing peak stress concentrations on the panel 32a, as mentioned previously.

Figure 9:
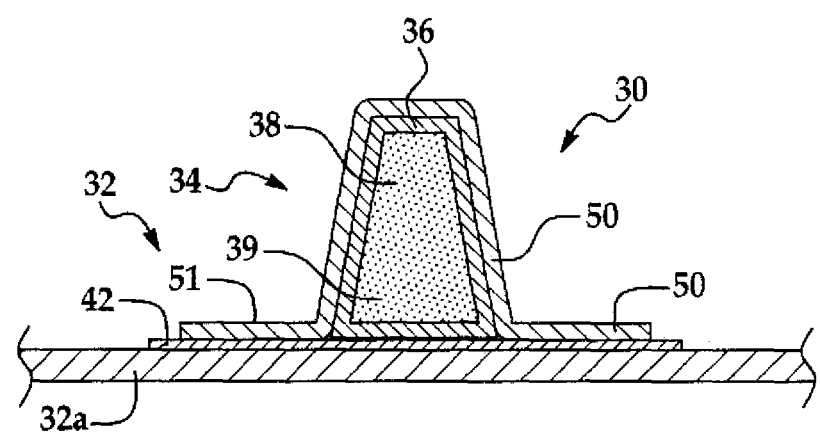

Still another example of the stiffener 34 is shown in FIG. 9. This embodiment of the stiffener 34 is similar to the embodiment shown in FIG. 2 except that one or more additional plies 50 are wrapped over the outer shell 36 and extend laterally to form flanges 51. The ply wraps 50 both strengthen the stiffener 34 and increase the area of contact between the panel 32a and the shell 38/flanges 51, while the flanges 51 form part of the stiffener runouts 52 which assist in minimizing peak stress concentrations on the panel 32a.

Figure 10:
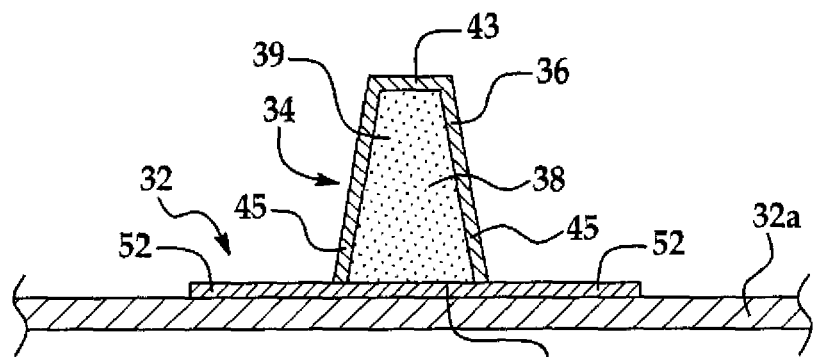

Another embodiment of the stiffener 34 is shown in FIG. 10 in which an outer shell 36 comprises a flat cap 43 and inclined sidewalls 45 that are joined to a base 35 having laterally extending flanges 52. As in the case of the embodiments shown in FIGS. 2 and 8, the laterally extending flanges 51 increase the area of the butt joint between the stiffener 34 and the panel 32a, while also providing a smooth transition between the shell 36 and the panel 32a that assists in minimizing peak stress concentrations on the panel 32a.

Figure 11:
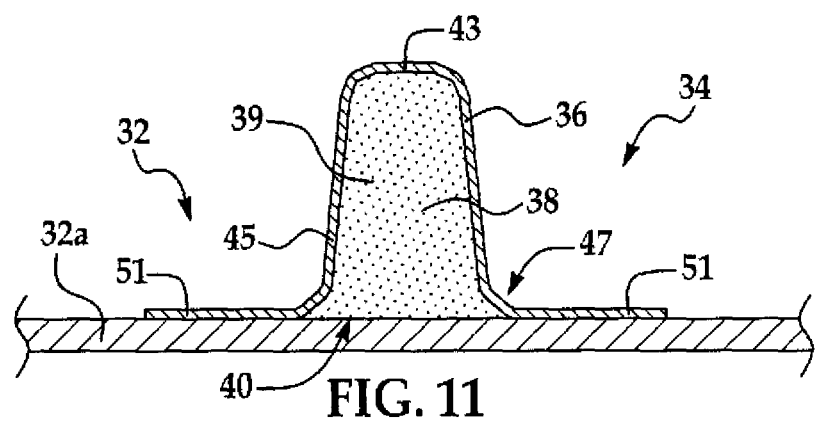

Another variation of the stiffener 34 is shown in FIG. 11 in which the outer shell 36 includes a radiused crown 43, and sidewalls 45. The sidewalls 45 transition through radius sections 47 into integral flanges 51 which are attached to the panel 32a.

Figure 12:
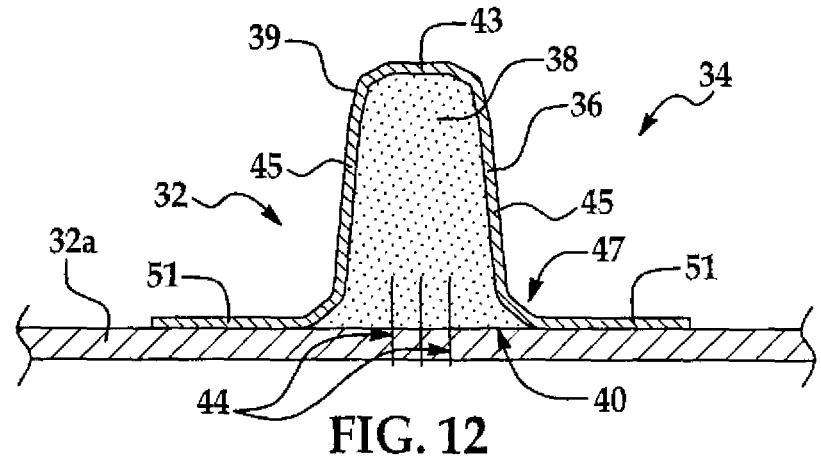

A further embodiment of the stiffener 34 shown in FIG. 12 which is similar to that shown in FIG. 11 except that through the thickness reinforcements 44 such as Z-pins 44 extend from within the core 38 into the panel 32a. The reinforcements 44 aid in joining the stiffener 34 to the panel 32a and provide additional reinforcement of the structure 32.

Figure 13:
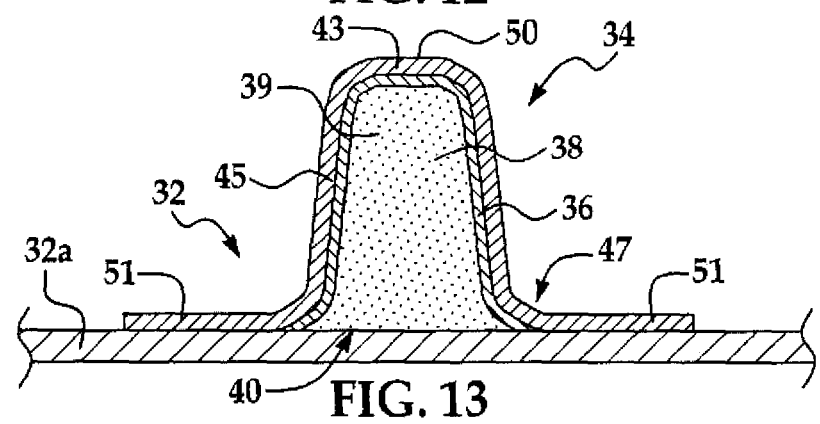

FIG. 13 illustrates another example of the stiffener 34 which is similar to that shown in FIG. 11 except that one or more additional plies 50 are wrapped over the outer shell 36 and are used to form laterally extending flanges 51.

From FIGS. 2-13, it may be appreciated that the stiffener 34 may have a wide range of geometries, features, core fillers and reinforcements which may add strength and/or stiffness to the stiffener 34 and/or increase the strength and/or damage tolerance of the joint 29 between the stiffener 34 and the panel 32a. It may also be appreciated from the forgoing description, that the stiffened composite structure 30 comprises a substantially continuous and homogeneous polymer resin matrix that functions to hold both a structural member portion 32 and a stiffener portion 34. The structure 30 is unitized by virtue of the structural member and stiffener portions 32, 34 respectively being integrated by the matrix material.

Figure 14:
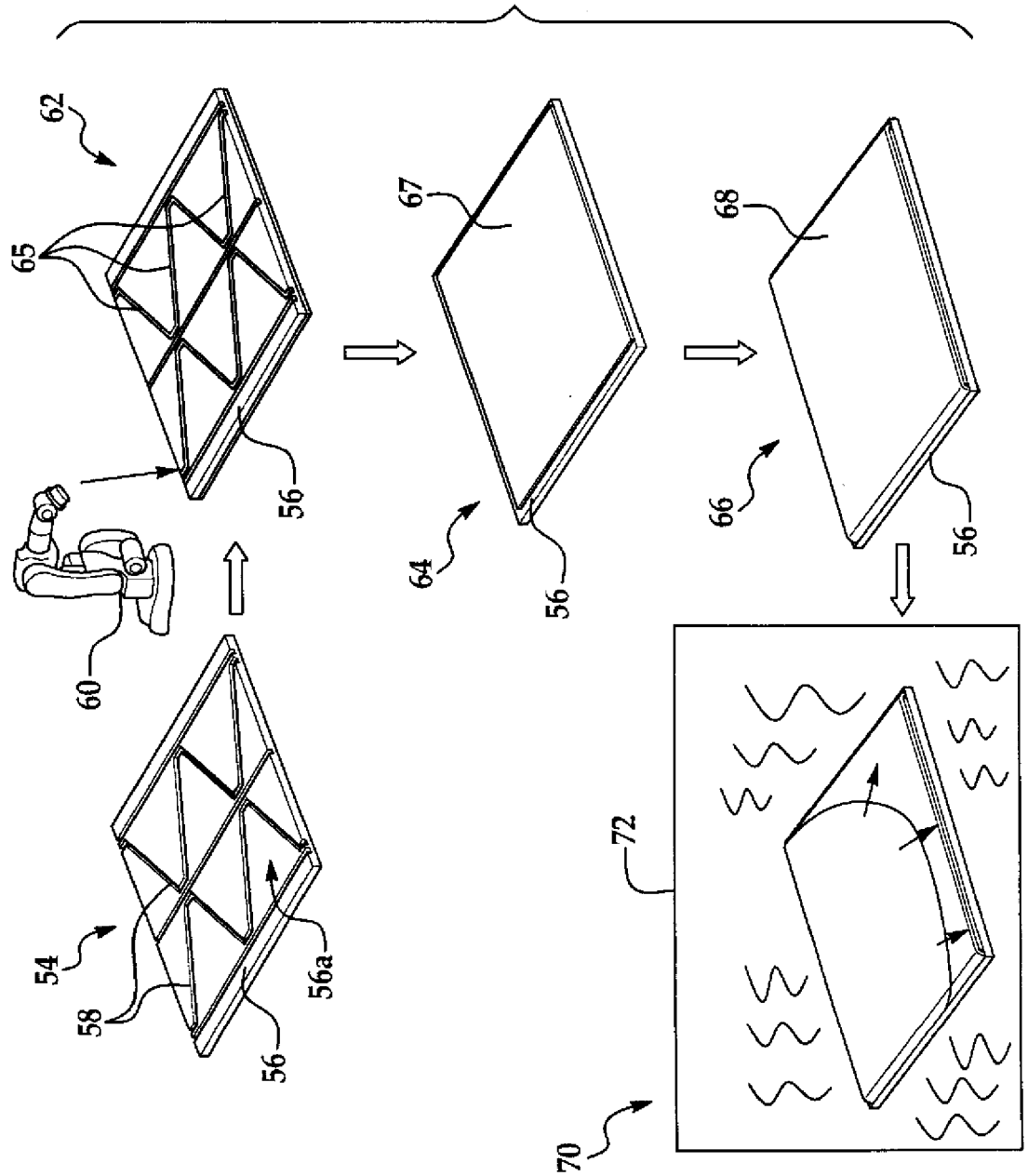
FIG. 14 is an illustration showing the assembly process used in making the stiffened composite structure according to the disclosed method.

Attention is now directed to FIG. 14 which illustrates several basic steps of a method of making a unitized composite structure 30 having one or more integrally formed stiffeners 34 (FIG. 1). As shown at 54, a single-piece, simple tool 56 has a tool face 56a that defines the inner mold line (IML) of the finished composite structure 30. The tool face 56a may be substantially flat, as shown in FIG. 14, or may have one or more curves or features matching the IML of the finished structure 30. One or more grooves 58 are formed in the tool face 56a that correspond to the geometry of the stiffeners 34 that are to be integrated into the finished structure 30. The depth D of the grooves 58 substantially correspond to the height H of the stiffeners 34 (see FIG. 15). The tool face 56a may also include additional, cavity-like grooves (not shown) into which nodal connectors (not shown) may be placed in order to form network-like interconnections between the stiffeners 34, as will be discussed below in more detail.

As shown at 62, dry, or substantially dry fiber stiffener preforms 65 are placed in the grooves 58 either manually, or using an automated placement equipment 60. Depending on the shape and construction of the stiffener preforms 65, portions of the stiffener preforms 65 may be tacked together with tackifiers or binders to assist in holding the preform 65 together and/or to maintain their shapes until they are infused with resin. Prior to being infused with resin and cured, the stiffener preforms 65 may be cord-like and continuous in length, allowing them to be stored in roll form, dispensed and cut to length as needed. Alternatively, the preforms 65 may be stiff and formed substantially to the required length, size and shape and stored flat, or any variation between continuous/flexible and discrete/stiff. When automated placement equipment 60 is used, the preforms 65 may be placed on the tool 56 at relatively high rates. Because the grooves 58 in the tool are pre-aligned, the location and orientation of the stiffeners 34 relative to the composite member 32 can be precisely controlled. In other words, the fixed position of the grooves 58 in the tool face 56a automatically indexes the preforms 65 relative to each other, and relative to the fiber reinforcement 65. The preforms 65 are substantially identical to the stiffeners 34 previously described except that they have not yet been infused with a resin and are therefore relatively flexible.

The grooves 58 may have a cross sectional profile (not shown) that substantially matches that of the preforms 65, so that when placed in the grooves 58, the preforms 65 substantially completely fill the grooves 58, resulting in a substantially smooth IML profile. Flexible preforms 65 readily conform to the cross sectional profile and curvature (if any) of the grooves 58. Discrete/stiff preforms may be pre-formed to at least substantially match the cross sectional profile and curvature (if any) of the grooves. The grooves 58 essentially recess the stiffener preforms 65 in the tool 56 relative to a fiber reinforcement 67 so that the top of the preforms 65 lie generally flush with the tool face 56a. Optionally, a film adhesive (not shown) may be placed in the grooves 58, overlying the stiffener preforms 65, in those applications where it is desired to adhesively bond the stiffener caps 35 to the composite member 32 along the butt joint 29, as shown in FIG. 2.

Next, as shown at 64, the dry or substantially dry composite member fiber reinforcement 67 is placed on the tool face 56a, overlying and contacting the stiffener preforms 65 and the tool face 56a. The composite member fiber reinforcement 67 as well as the fiber preforms 65 may be tackified with a binder (not shown). The composite member fiber reinforcement 67 may comprise, for example and without limitation, a preform that may include multiple plies of woven or knitted fabric that are laid up ply-by-ply on the tool face 56a, or which are stacked and then placed as a single pre-assembled lay-up on the tool face 56a. In the illustrated example, the composite member fiber reinforcement 67 is substantially flat however, in other embodiments, it is possible that the composite member fiber reinforcement 67 may be a preform that is shaped before the composite member fiber reinforcement 67 is placed on the tool face 56a. At 66, a caul sheet 68 is placed over the composite member fiber member reinforcement 67. The caul sheet 68 aids in controlling the OML (outer mold line) surface finish and skin mark-off adjacent the stiffener 34. Then, at 70, preform 65 and composite member fiber reinforcement 67 are co-infused with a suitable thermoset resin using any of various well known resin infusion techniques, including, for example and without limitation, vacuum assisted resin infusion molding (VARIM). As will be discussed below, the preform 65 and fiber reinforcement 67 may be compacted and consolidated prior to resin infusion. The infused preform 65 and composite member fiber reinforcement 67 are then cured by the application of heat though any suitable means such as an oven 72.

Figure 15:
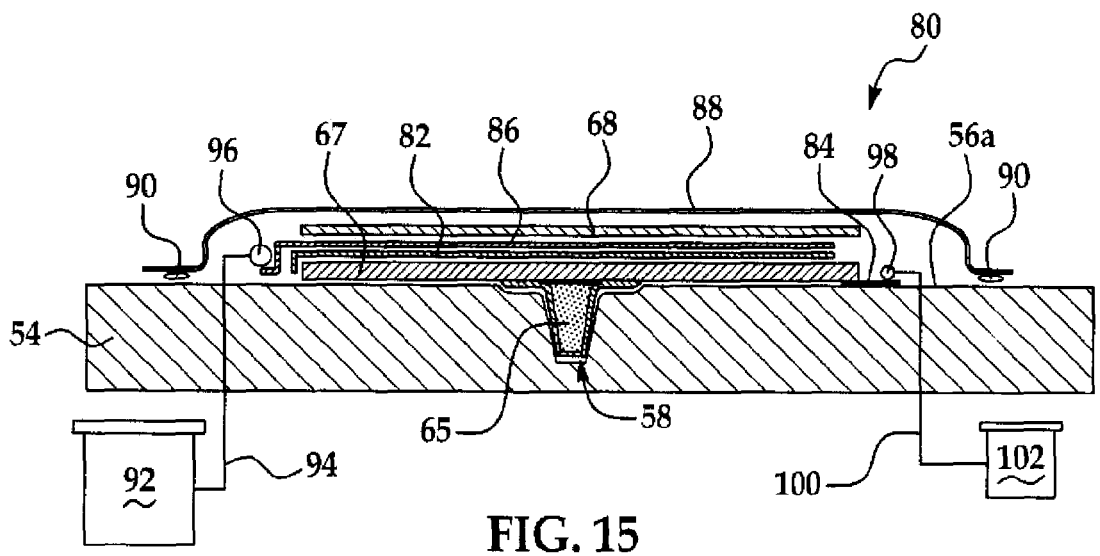
FIG. 15 is an illustration of a cross sectional view of apparatus, slightly exploded for clarity, to make a unitized, composite structure having integrally formed stiffeners.

Attention is now directed to FIG. 15 which shows additional details of a VARIM layup assembly 80 that may be used to carry out the steps of the method previously discussed in connection with FIG. 14. The stiffener preforms 65 are placed in the grooves 58 in the tool 54, following which the composite member reinforcement 67 is placed on the tool face 56, overlying and in contact with the stiffener preform 65. A peel ply 82 is placed over the composite member fiber reinforcement 67 and a suitable resin distribution media 86 is placed over the peel ply 82 to aid in moving and evenly distributing flowing resin. A peel ply 84 may also be placed under the outer edges of the composite member fiber 67.

A rigid or semi-rigid caul sheet 68 is placed over the resin distribution media 86, following which a vacuum bag 88 is placed over the layup and is sealed to the tool 54 by means of a sealant tape 90 or by similar means. In other embodiments, a double vacuum bag technique may be used in which a second vacuum bag (not shown) is placed over the first vacuum bag 88 in order to protect the preform 65 from leaks in the first vacuum bag 88 during the resin infusion and curing processes. The use of the caul sheet 68 and resin distribution media 86 is illustrative of one typical arrangement for resin infusion, but may not be required when other resin infusion techniques are employed. A variety of other resin infusion techniques are possible. A supply reservoir of thermoset resin 92 is coupled by a resin inlet tube 94 to an inlet channel tube 96 within the vacuum bag 88. An outlet vacuum reservoir 102 is coupled by a resin outlet tube 100 to an outlet channel tube 98 inside the vacuum bag 88.

A vacuum within the bag 88 generated by the outlet vacuum reservoir 102 evacuates the bag 88 of air, creating a pressure less than atmospheric pressure within the bag 88 that draws resin from the supply reservoir 92 into the bag through the inlet channel tube 96. Prior to resin infusion, the bag 88 may be used to compact and consolidate the preform 65 and fiber reinforcement 67. Resin flows from the inlet channel tube 96 and exits the bag 88 through the outlet channel tube 98 where it is collected in the vacuum reservoir 102. As the resin travels from the inlet channel 96 to the outlet channel 98, preform 65 and composite member fiber reinforcement 67 are co-infused with a single shot of the resin while atmospheric pressure forces the bag 88 down onto the caul sheet 68. As mentioned earlier, FIG. 15 illustrates merely one of a number of resin infusion techniques that may be used to make the stiffened composite structure 30.

The caul sheet 68 applies substantially even pressure over its area to the infused preform 65 and composite member fiber reinforcement 67, causing the preform 65 and composite member fiber reinforcement 67 to be compacted and forced against each other during the resin infusion process. Heat may be applied to the infused preform 65 and composite member fiber reinforcement 67 both during and after the resin infusion process in order to encourage the resin flow, and then cure the resin to produce a unitized composite structure 30 in which the stiffeners 34 are essentially integrated into the composite member 32. The co-infusion of the preform 65 and composite member fiber reinforcement 67 with resin results in a substantially continuous and homogeneous resin matrix which holds and integrates the structural member and stiffener portions 32, 34 respectively.

Figure 16:
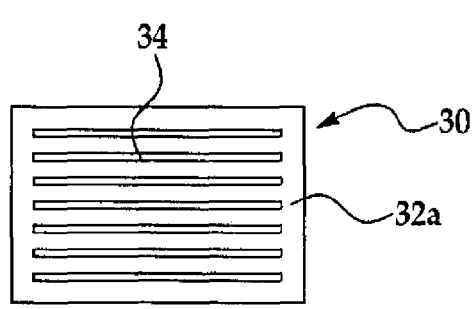
FIGS. 16-20 are illustrations of plan views of stiffened composite structures having differing configurations of stiffener layout.
Figure 17:
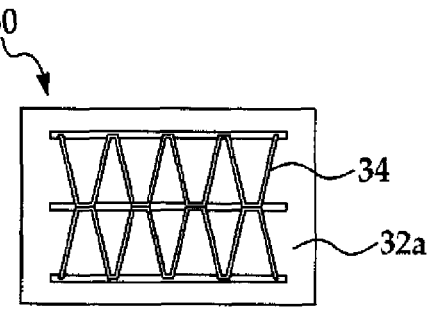
Figure 18:
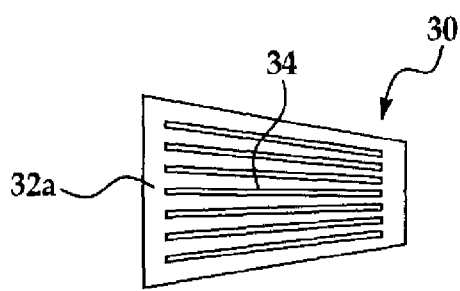
Figure 19:
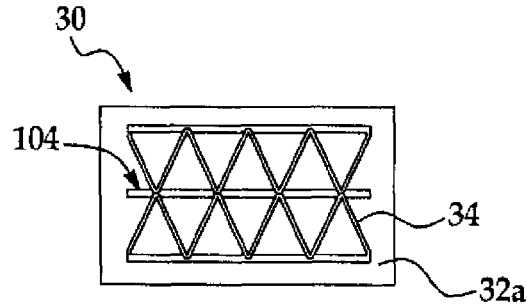
Figure 20:
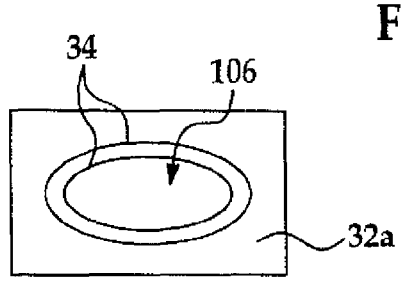

FIGS. 16-20 illustrate stiffened composite structures 30 having various layout patterns of the stiffeners 34. FIG. 16 illustrates a composite panel 32a stiffened with a plurality of integrally formed, generally parallel stiffeners 34, similar to the embodiments shown in FIG. 1. FIG. 17 illustrates a stiffened composite panel 32a in which the stiffeners 34 are arranged in a crossing-like grid pattern. FIG. 18 shows another variation in which the stiffeners 34 are arranged side-by-side but collectively taper along the length of the panel 32a. FIG. 19 illustrates an embodiment in which the stiffeners 34 are arranged in an iso-grid pattern, wherein the ends of the stiffeners 34 are interconnected at connecting nodes 104. FIG. 20 shows the use of generally concentric, oval stiffeners 34 surrounding an opening 106 in a panel 32a in order to reinforce the area of the panel 32a around the opening 106.

Figure 21:
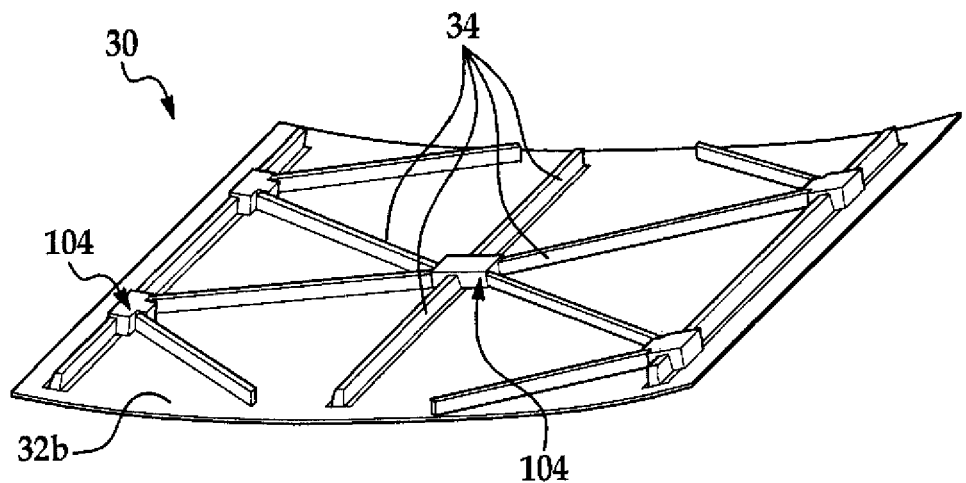
FIG. 21 is an illustration of a perspective view of a unitized aircraft skin having an integrally formed network of stiffeners.

FIG. 21 illustrates another example of a nodal grid stiffened panel 32b in which the stiffeners 34 are interconnected by connecting nodes 104 which may be recessed into the tool face 56a (FIGS. 14 and 15) during forming so that the connecting nodes 104 and the stiffeners 34 are integrally formed with each other and with the panel 32a during the fabrication process. In this example, the panel 32 is curved in a single direction, and thus, at least a certain number of the stiffeners 34 are also curved in the direction of the panel curvature. The connecting nodes 104 may comprise, for example and without limitation, a preformed rigid member, such as a metal member, a pre-cured composite member, or a dry or substantially dry fiber preform that is co-infused with resin with the composite member fiber reinforcement 67. In those embodiments where the connecting node 104 is a preformed rigid member, it may be co-bonded with the stiffener 34 and panel 32a, or it may be secondarily bonded with the stiffener 34 and the panel 32a using a layer (not shown) of adhesive placed between the connecting node 104, the stiffener 34 and the panel 32a.

Figure 22:
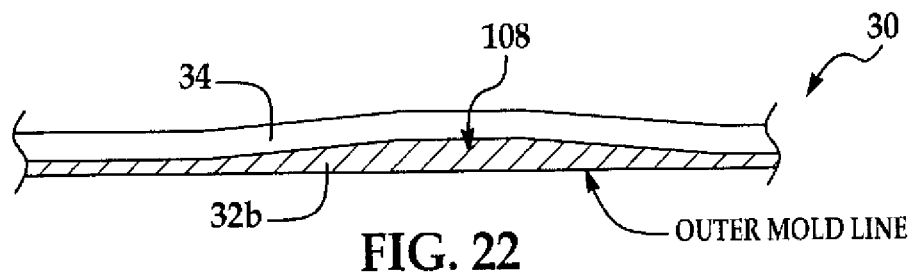
FIG. 22 is an illustration of a sectional view of a composite structure having an integral stiffener conforming to a thickness variation in the structure.

FIG. 22 illustrates a panel 32 having a variation 108 in thickness. This variation in thickness 108 may be accommodated by forming an appropriate depth contour in the tool face 56. The flexibility of the stiffener preform 65 allows the preform 65 to conform to the thickness contour 108 of the underlying panel 32b.

Figure 23:
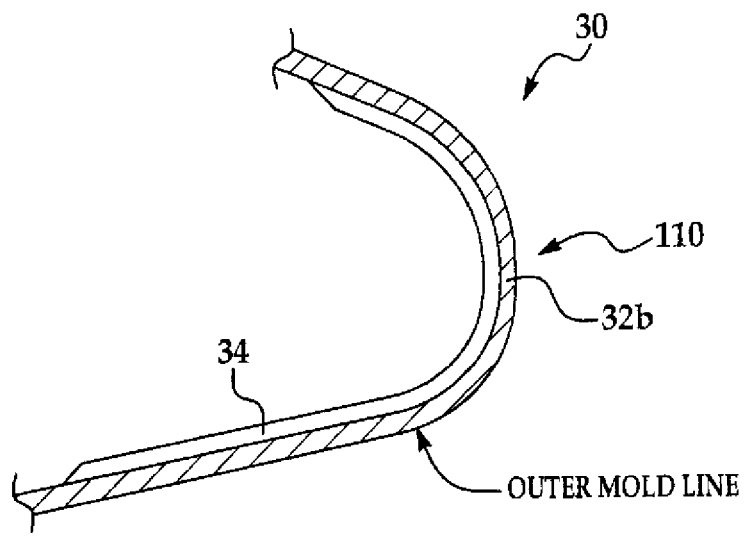
FIG. 23 is an illustration of a sectional view of a curved leading edge of an aircraft skin having an integrally formed stiffener.

FIG. 23 illustrates another unitized, stiffened composite structure 30 in the form of a leading edge 110 of an aircraft wing. This example illustrates the ability of the stiffeners 34 to conform to relatively severe curvatures, including compound curvatures. Of the composite members 32 that they are intended to stiffen.

Figure 24:
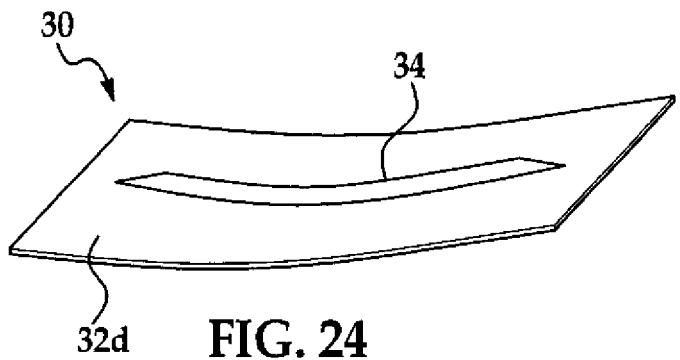
FIG. 24 is an illustration of a perspective view of a curved panel having an integrally formed stiffener.

FIG. 24 illustrates the use of a stiffener 34 to reinforce a panel 32 curved in one direction. The curvature of the stiffener 34 matches that of the panel 32.

Figure 25:
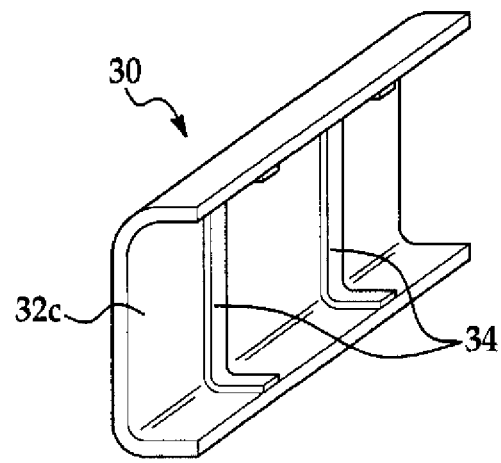
FIG. 25 is an illustration of a perspective view of a C-shaped structural member having integrally formed stiffeners.

FIG. 25 illustrates a unitized, stiffened composite structure 30 in the form of a C-shaped channel beam 32c that is reinforced by integrally formed rib-like stiffeners 34 matching the cross section of the beam 32c and which are spaced along the length of the beam 32c The rib-like stiffeners 34 may be employed in composite structures 30 having other cross sectional shapes.

Figure 26:
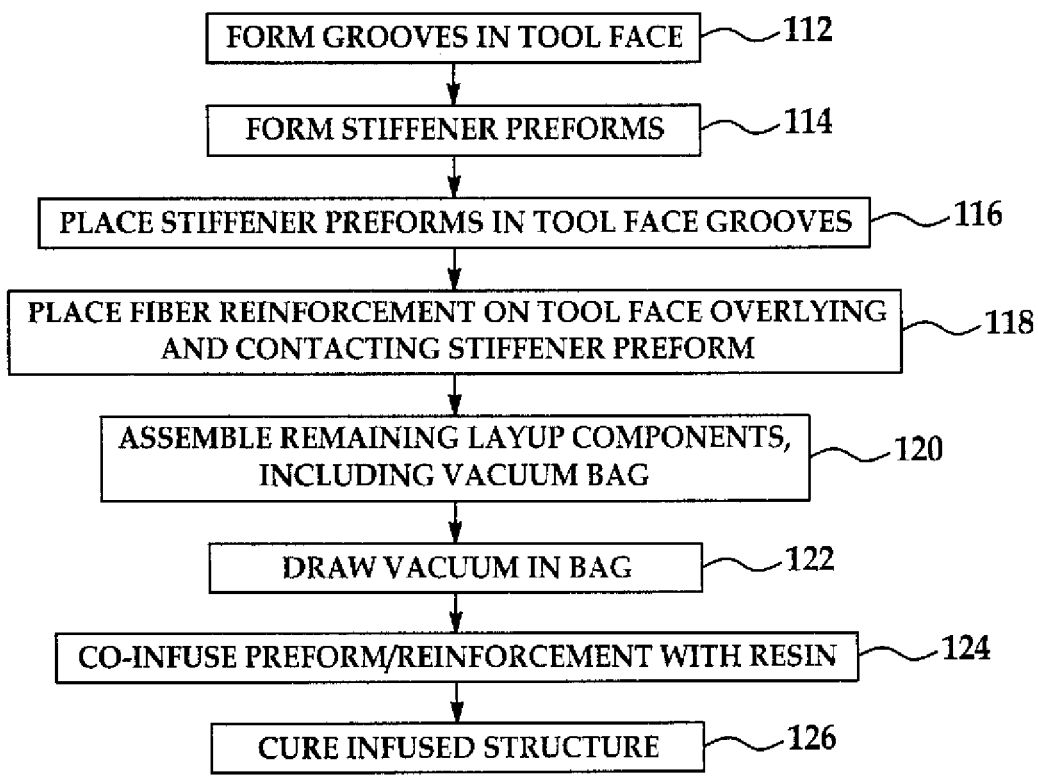
FIG. 26 is an illustration of a flow diagram of the overall steps of a method of making composite structures with integral stiffeners.
Figure 27:
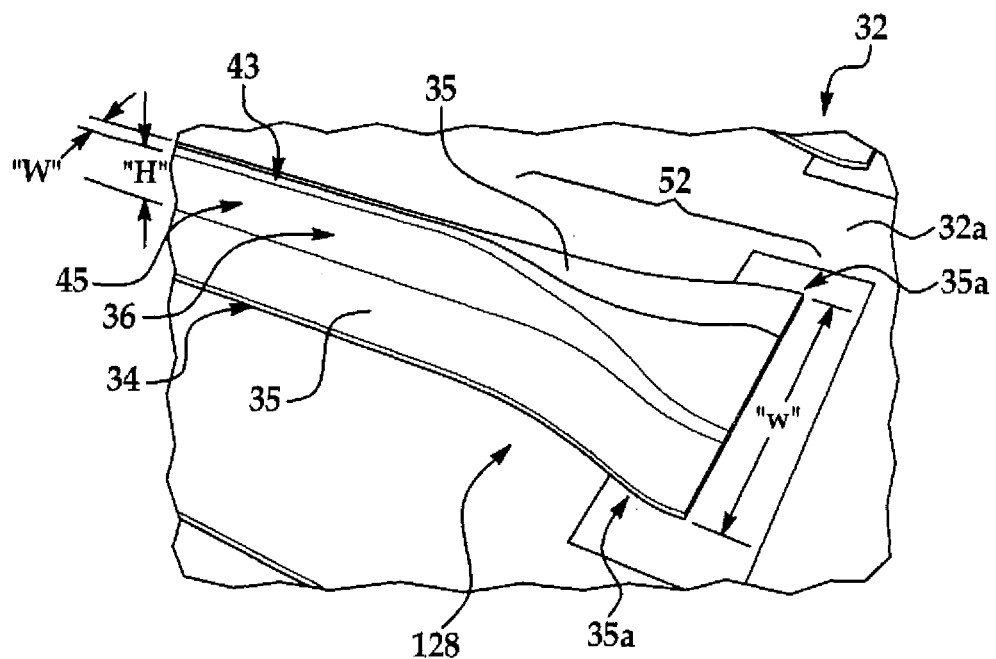
FIG. 27 is an illustration of a perspective view showing the runout of a stiffener integrated into a composite skin.
Figure 28:
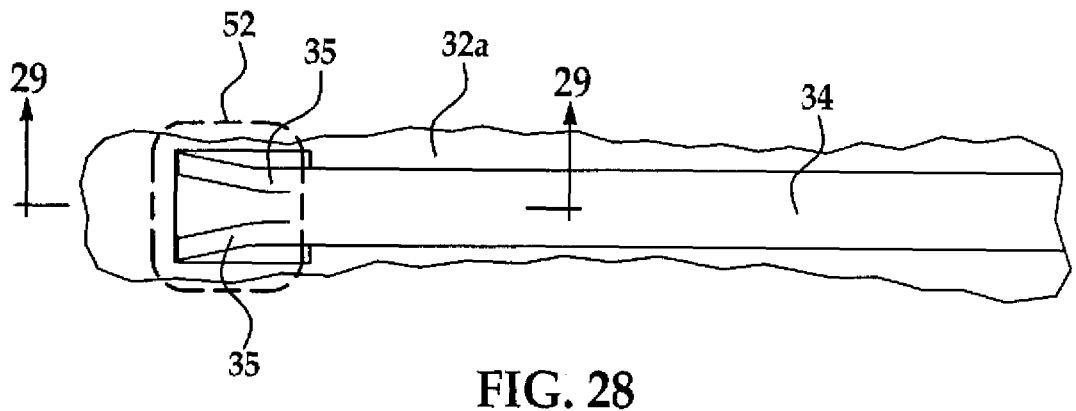
FIG. 28 is an illustration of a plan view of the stiffener shown in FIG. 27.

Attention is now directed to FIG. 26 which broadly illustrates the steps of a method of making a unitized composite structure 30 having the disclosed integrally formed stiffeners 34. Beginning at step 112, grooves 58 having the appropriate depth and geometry are formed in the tool face 56a by any suitable fabrication technique, such as milling the grooves 58 in a hard material such as steel. At 114, the stiffener preforms 65 are formed which may include laying up multiple plies of dry fiber material, which as previously noted, may comprise a braided, woven or knitted material. The stiffener preforms 65 may or may not be filled with a filler of the types previously discussed.

At 116, the stiffener preforms 65 are placed in the grooves 58 in the tool face 56a, following which at 118 the composite member fiber reinforcement 67 is placed on the tool face 56a, overlying and contacting the stiffener preforms 65, as previously described in connection with FIG. 11. At 120, the remaining components of the layup 80 are assembled, including placing the vacuum bag 88 over the preform 65 and composite member fiber reinforcement 67 and sealing it to the tool 54. Next, at 122, a vacuum is drawn in the bag 88, following which at 124, the preform 65 and composite member fiber reinforcement 67 are infused substantially simultaneously (i.e. co-infused) with a thermoset resin in a one-shot resin infusion process. The vacuum within the bag 88 may aid in drawing the resin into and through the preform 65 and the composite member fiber reinforcement 67. Although not shown in FIG. 26, a vacuum can be drawn in the bag 88 prior to the resin infusion step 124 in order to compact and consolidate the stiffener preform 65 and the fiber reinforcement 67 in order to reduce their volume so that a composite structure is produced having the lowest volume of resin. Alternatively, the compaction and consolidation process may be achieved during the resin infusion step 124. Finally, at step 126, the resin infused structure is cured by heating the structure according to a desired cure schedule.

Reference is now made to FIGS. 27-32 which illustrate additional details of the runout 52 on each end of each of the stiffeners 34, previously mentioned in connection with FIG. 1. The runouts 52 form a substantially smooth and continuous transition of the ends 128 of the stiffener 34 into the surrounding composite member 32, which in this case, is a panel or skin 32a. Intermediate the ends 128 of the stiffener 34, the cross sectional geometry of the stiffener 34 is defined by the shell 36 and the base cap 35. Intermediate the ends 128, the top or crown 43 of the shell 36 is relatively narrow, and the sides 45 are relatively steep, while the base cap 35 has a substantially constant width. Along the runout 52, however, the width "W" of the crown 128 constantly increases, while the height "H" of the side 45 constantly decreases, and the base cap 34 splays outwardly as shown at 35a. The rate of change in the width "W" the crown 43, the height "H" of the sides 45 and width "w" of the base cap 35 will depend upon the particular application, and the geometry of the skin 32a.

Figure 30:
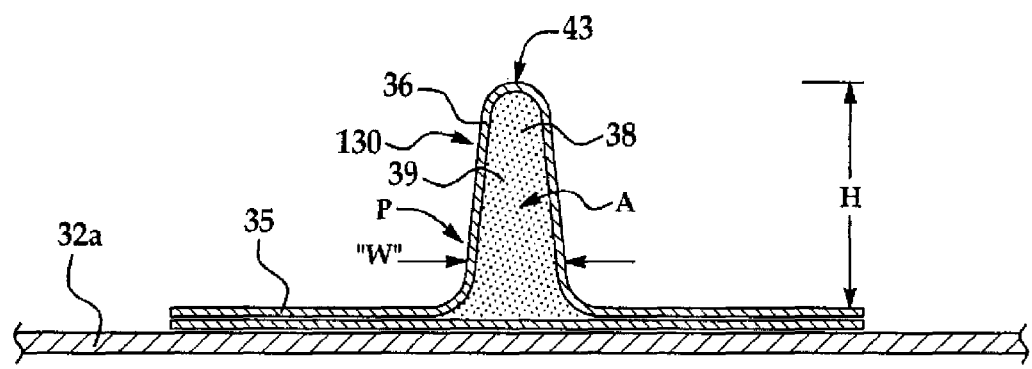
FIG. 30 is a sectional view taken along the line 30-30 in FIG. 29.
Figure 31:
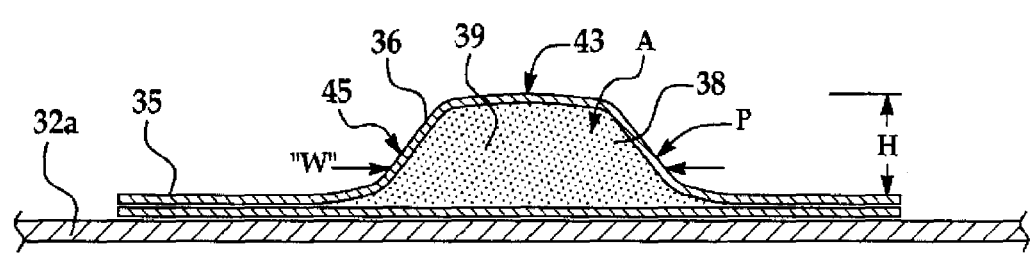
FIG. 31 is an illustration of a sectional view taken along the line 31-31 in FIG. 29.
Figure 32:
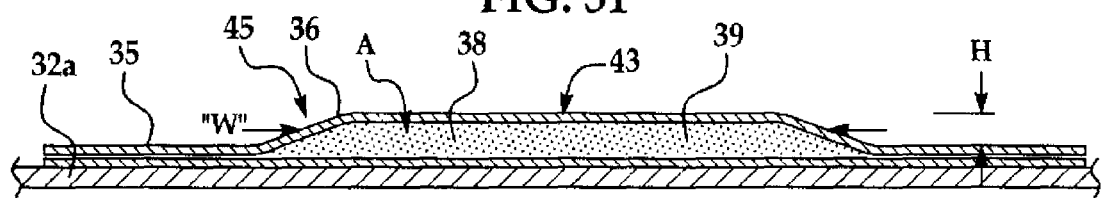
FIG. 32 is an illustration of a sectional view taken along the line 32-32 in FIG. 29.

Attention is now particularly directed to FIGS. 30-32 which show the change in cross sectional profile of the stiffener 34. Although not drawn to scale, these figures illustrate that as the height "H" decreases along the runout 52, the width "W" increases. However, the total cross sectional area "A" of the stiffener 34 remains substantially constant along the length of the runout 52. The constant cross section of the runout 52 results in the internal structure of the stiffener 34 continuing to the outer extremities of the stiffener 34. Maintaining constant cross sectional area "A" allows the core 38 to be continuous throughout the runout 52, and may therefore not require any material such as carbon tows to terminate (drop-off) at an intermediate point along the runout 52 which may otherwise create production complexity, potential resin rich zones and stress concentrations in the cured structure 30.

Figure 29:
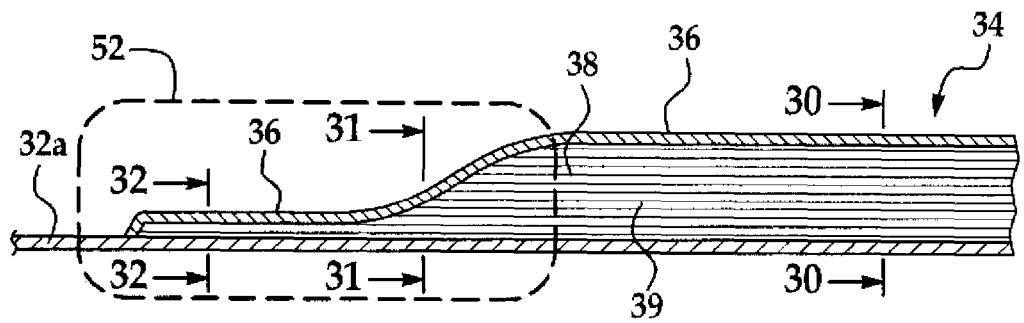
FIG. 29 is an illustration of a sectional view taken along the line 29-29 in FIG. 28.
Figure 33:
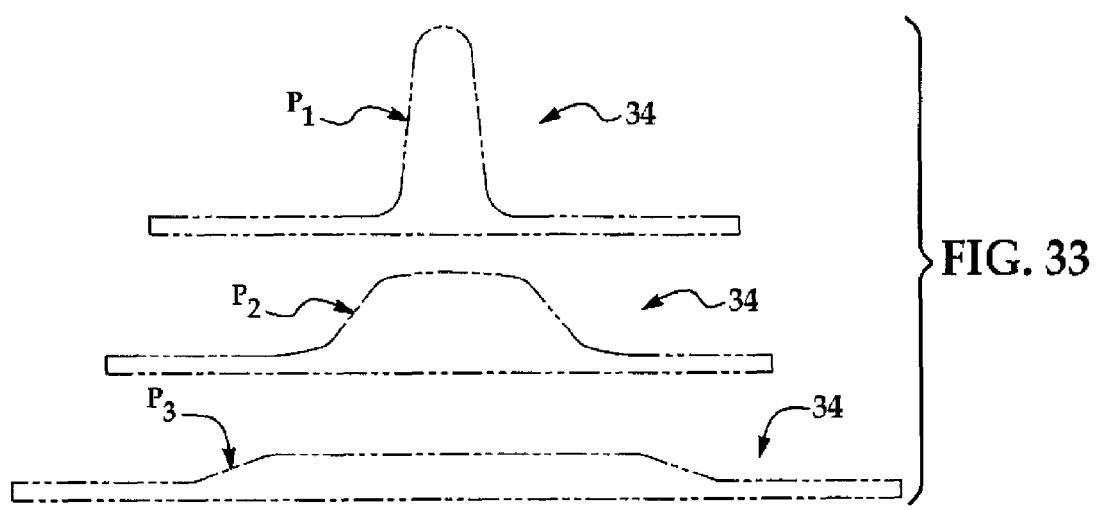
FIG. 33 is an illustration of diagrams of the perimeter at different locations along the runout.

FIG. 33 illustrates the perimeter "P" of the cross sections shown in FIGS. 30-32. Like the total cross sectional area "A" of the stiffener 34, the total perimeter "P" of the cross section of the stiffener 34 remains substantially constant along the length of the runout 52. Thus, the perimeter $P_1$ of the stiffener 34 at section line 30-30 in FIG. 29 is equal to the perimeter $P_2$ at section line 31-31 and is equal to perimeter $P_3$ at section line 32-32 in FIG. 29. The provision of a constant perimeter in the runout 52 allows a constant fiber orientation within the outer shell 36 to be maintained throughout the length of the runout 52 which aids in minimizing fiber distortion that could otherwise lead to resin rich zones and a reduction in mechanical properties.

Figure 34:
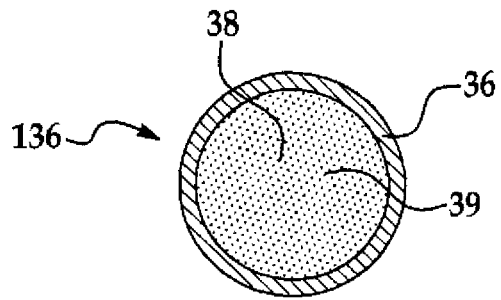
FIG. 34 is an illustration of a cross sectional view of a tubular preform used to fabricate the stiffener.
Figure 35:
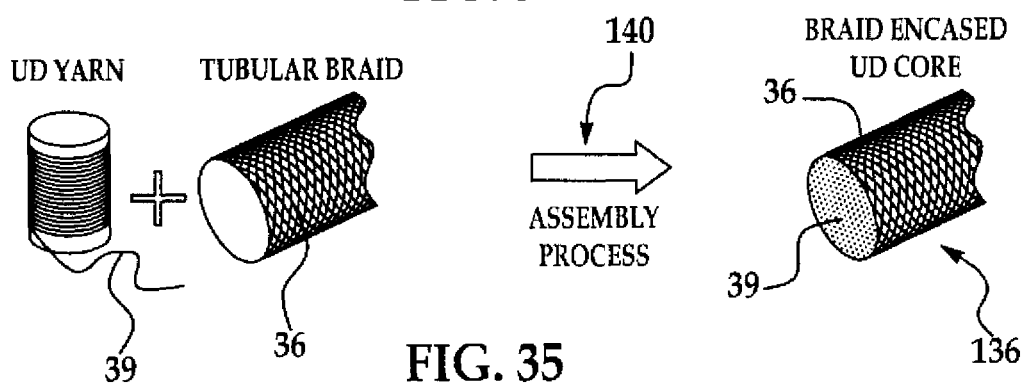
FIG. 35 is an illustration of steps used in the fabrication of the tubular preform shown in FIG. 34.
Figure 36:
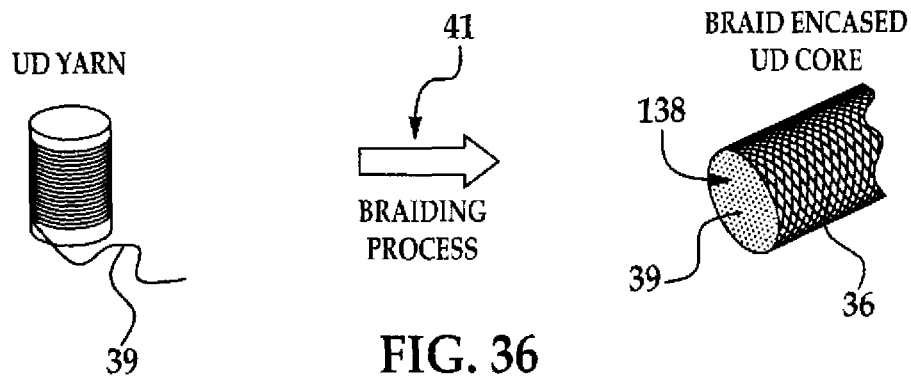
FIG. 36 is an illustration of an alternative method for fabricating the tubular preform shown in FIG. 35.

FIG. 34 illustrates one embodiment of a fiber preform 136 that may be resin infused to form the stiffener 34, including the runout 52 shown in FIGS. 27-33. In this example, the preform 136 comprises a braided fiber tubular shell 36 having a core 38 filled with loose, unidirectional fibers 39. Other core fillers are possible. As shown in FIG. 35, the tubular fiber preform 136 may be fabricated in continuous lengths (not shown) by an assembly process 140 that involves braiding unidirectional yarn 39 into a tubular braided shell 36. The shell 36 may then be filled with unidirectional fiber tows 39. Use of the tubular preform 136 may be desirable in some applications because it may be efficiently cut to length from a continuous supply and is readily conformable both in cross section and along its length to tool recesses, such as the tool recess 58 shown in FIG. 15. An alternative method of fabricating the preform 136 is illustrated in FIG. 36, wherein a single braiding process 41 may be employed to form the shell 36 around a group 138 of unidirectional fibers 39.

Figure 37:
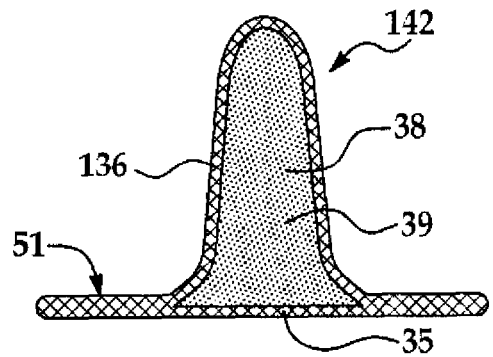
FIG. 37 is an illustration of a cross sectional view of an alternate embodiment of the preform.

FIG. 37 illustrates an alternate embodiment of a rigid or semi-rigid fiber preform 142 for forming the stiffener 34 with a runout 52. The preform 142 comprises a shaped, braided shell 136 which may include lateral flanges and a core 38 filled with unidirectional reinforcement fibers 39. The preform 142 shown in FIG. 37 may be fabricated by a process illustrated in FIG. 38, wherein a single braiding and forming process 146 may be employed to form the shell 136 around a group 138 of unidirectional fibers 39 in which the cross sectional shape of the preform 142 substantially matches that of a mold cavity 58 (FIG. 15). In this example, the shell 136 and the group 138 of fibers unidirectional fibers 39 are braided together and formed to shape substantially simultaneously. The formed preform 142 may be fabricated in continuous lengths (not shown).

FIG. 39 illustrates a further embodiment of a preform 148 comprising a shell 36 formed by fabric overlap plies which includes lateral flanges 51, and a fabric base cap 35. The preform 148 further includes a core 38 filled with unidirectional fibers 39. The preform 148 may be formed in discrete lengths (not shown) and may be substantially rigid both in cross section, and along its length. FIG. 40 illustrates one process for fabricating the preform 148 shown in FIG. 39. Beginning at 150, a recess 158 having a suitable geometry is formed in a tool 54, and an overlap fabric ply 160 is placed on the tool 54 overlying the recess 58. At 152, a forming tool 162 is used to form the ply 160 into the recess 158 and conform it to the contours of the recess 158, using force F applied to the forming tool 162. At 154, the tool 162 is removed, the formed overlap ply 160 is filled with unidirectional reinforcing fibers 39, and a second overlap ply 165 is placed over the first ply 160. At 156, a suitable tool 167 may be used to compact the plies 160, 165.

Figure 41:
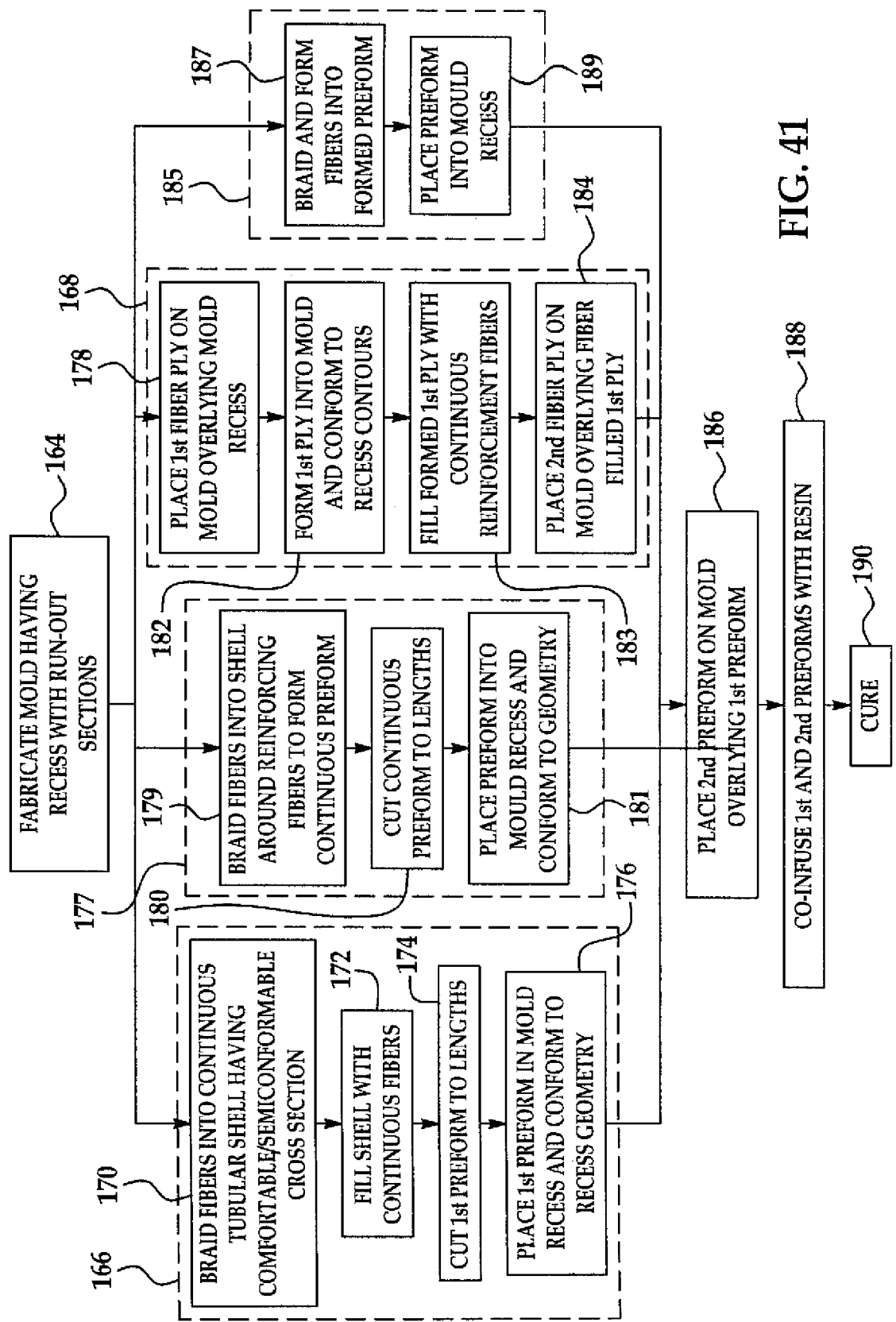
FIG. 41 is an illustration of a flow diagram of a method of fabricating a unitized composite structure having integrated stiffeners.
Figure 42:
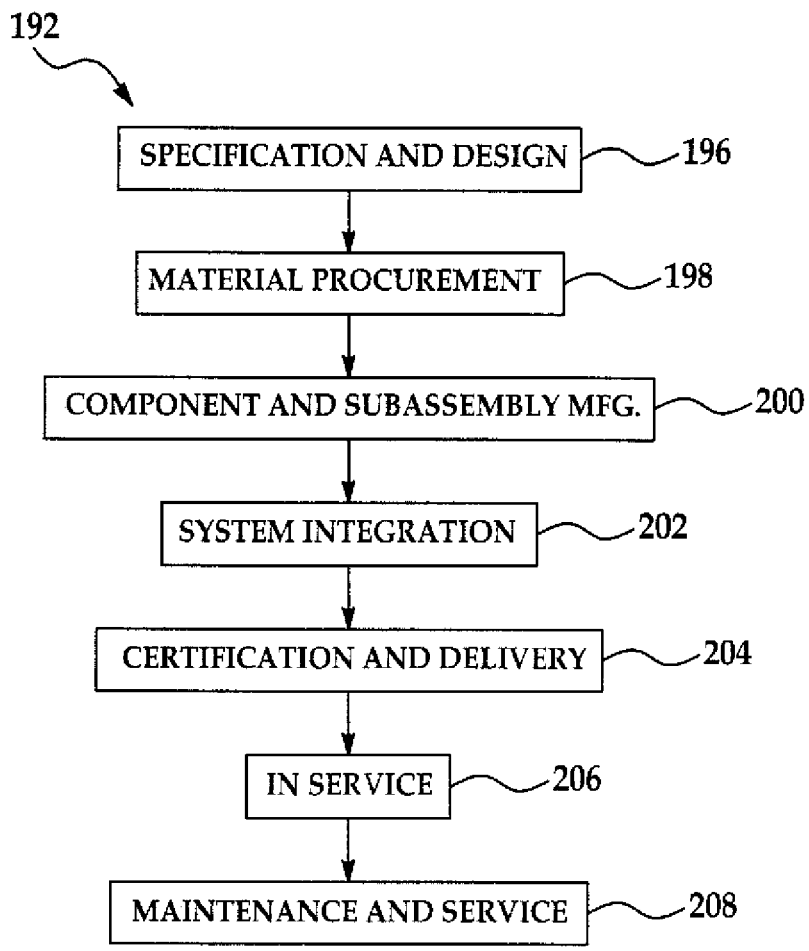
FIG. 42 is an illustration of a flow diagram of aircraft production and service methodology.
Figure 43:
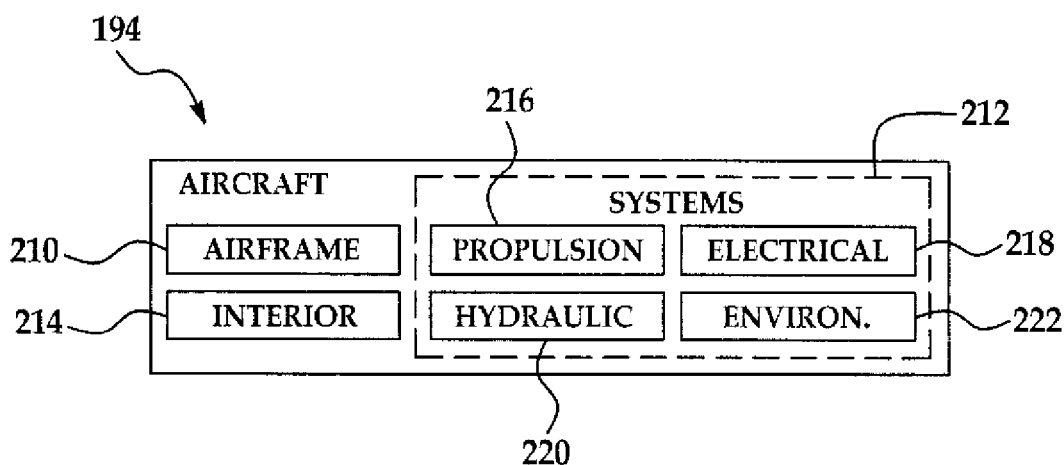
FIG. 43 is an illustration of a block diagram of an aircraft.

Reference is now made to FIG. 41 which broadly illustrates the steps of a method of fabricating a unitized, stiffened composite structure 30 such as the stiffened panel 32 shown in FIG. 1. Beginning at 164, a mold 54 (FIG. 15) is fabricated having recesses that include runout sections 52 on opposite ends 128 (FIG. 27) thereof. In one embodiment shown at 166, a first fiber preform or reinforcement 136, 142 may be fabricated in continuous lengths. At 170, fibers are braided into a continuous tubular outer shell 36 having a conformable or semi-conformable cross section. At 172, the tubular shell is filled with continuous reinforcing fibers and at 174 the first preform 136, 142 is cut to suitable lengths.

At 176, the first preform is placed in a mold recess 58 and conformed to the geometry of the recess 58.

Another embodiment for making the first fiber preform is shown at 177. At 179, a single braiding process is used to form the shell 36 around a group 138 of unidirectional fibers 39, and at 180 the first preform 136 is cut to suitable lengths. At 181 the flexible preform 136 is placed in the mold recess 58 and conformed to the geometry of the recess 58.

In a further embodiment for making the first fiber preform shown at 168, a first fiber ply 160 is placed on a mold 54 overlying a mold recess 158, as shown at 178. Next at 182, the first fiber ply 160 is formed into the mold recess 158 and conformed to the contours of the recess 158. At 183, the formed first ply 160 is filled with continuous reinforcement fibers 39, following which, at 184, a second fiber ply 165 is placed on the mold 54 overlying the fiber filled first ply 160.

Still another embodiment for making the first preform 142 is shown at 185. At 187, shell and core fibers are braided together and simultaneously formed into a semi-rigid preform 142 that is pre-shaped to substantially match the geometry of the mold recess 58. The pre-shaped and semi-rigid preform 142 is then placed into the mold recess 58 at 189.

After the first preform 136, 142 is made as described above, a second preform or fiber reinforcement 67 (FIG. 14) is placed on the mold 54 overlying the first preform, as shown at 186. At 188, the first and second preforms are co-infused with resin, following which the composite structure 30 is cured at 190.

Embodiments of the disclosure may find use in a variety of potential applications, particularly in the transportation industry, including for example, aerospace, marine and automotive applications. Thus, referring now to FIGS. 37 and 38, embodiments of the disclosure may be used in the context of an aircraft manufacturing and service method 192 as shown in FIG. 37 and an aircraft 194 as shown in FIG. 38. Aircraft applications of the disclosed embodiments may include a wide variety of structural composite parts and components, including for example and without limitation, control surface skins, wing and empennage skins, stiffened access doors and panels, and stiffened ribs and spar webs, to name only a few. During pre-production, exemplary method 192 may include specification and design 196 of the aircraft 194 and material procurement 198. During production, component and subassembly manufacturing 200 and system integration 202 of the aircraft 194 takes place. Thereafter, the aircraft 194 may go through certification and delivery 204 in order to be placed in service 206. While in service by a customer, the aircraft 194 is scheduled for routine maintenance and service 208 (which may also include modification, reconfiguration, refurbishment, and so on).

Each of the processes of method 192 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 38, the aircraft 194 produced by exemplary method 192 may include an airframe 210 with a plurality of systems 212 and an interior 214. Examples of high-level systems 212 include one or more of a propulsion system 216, an electrical system 218, a hydraulic system 220, and an environmental system 222. Any number of other systems may be included. The disclosed method may be employed to fabricate stiffened parts, structures and components used in the interior 214 and in the airframe 210. Although an aerospace example is shown, the principles of the disclosure may be applied to other industries, such as the marine and automotive industries.

Systems and methods embodied herein may be employed during any one or more of the stages of the production and service method 192. For example, parts, structures and components corresponding to production process 200 may be fabricated or manufactured in a manner similar to parts, structures and components produced while the aircraft 194 is in service. Also the disclosed method embodiments may be utilized during the production stages 200 and 202, for example, by substantially expediting assembly of or reducing the cost of an aircraft 194. Similarly, one or more of apparatus embodiments, method embodiments, or a combination thereof may be utilized while the aircraft 194 is in service, for example and without limitation, to maintenance and service 208.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of making a stiffened composite structure, comprising:
    fabricating a first fiber preform, wherein fabricating the first fiber preform includes filling a flexible tubular shell with continuous unidirectional fibers;
    placing the first fiber preform in a mold recess having the geometry of the stiffener;
    placing a second fiber preform over the mold recess covering the first preform;
    co-infusing the first and second fiber preforms with a polymer resin; and
    curing the resin-infused preforms.

2. The method of claim 1, wherein:
    fabricating the first fiber preform further includes braiding fibers into the flexible tubular shell, and
    placing the first fiber preform in the mold recess includes conforming the tubular shell to the geometry of the recess.

3. The method of claim 2, wherein braiding fibers into a flexible tubular shell includes producing a substantially continuous length of the tubular shell, and the method further comprises:
    cutting a section of the continuous length of tubular shell, and wherein placing the first preform in the mold recess is performed by placing the cut section of the shell in the recess.

4. The method of claim 1, wherein fabricating the first fiber preform includes:
    simultaneously braiding together and forming to shape a fiber shell and a fiber core.

5. The method of claim 1, wherein fabricating the first preform includes:
    making a continuous shell having a reinforced core by braiding fibers around a group of continuous reinforcing fibers, and
    cutting the continuous shell to desired lengths.

6. The method of claim 1, wherein fabricating the first preform includes:
    placing a first fabric ply over the mold recess,
    forming the first ply into the interior of the mold recess,
    filling the formed first ply with continuous reinforcing fibers, overlaying a second fabric ply on the formed fiber filled first ply.

7. A method of making a unitized and stiffened composite aircraft skin, comprising:
fabricating a mold having a recess therein corresponding the geometry of the stiffener, including forming a runout in the recess;
fabricating a first fiber preform by braiding a fabric into a flexible tube, and filling the tube with continuous reinforcement fibers;
placing the first fiber preform in the mold recess, including conforming the first preform to the shape of the runout;
placing a second fiber preform on the mold overlying the first fiber preform;
co-infusing the first and second fiber preforms with a polymer resin; and
curing the resin-infused preforms.

* * * * *